United States Patent
Pradhan et al.

(10) Patent No.: US 12,217,044 B2
(45) Date of Patent: Feb. 4, 2025

(54) SYSTEM AND METHOD FOR PROVIDING ENRICHED CONNECTED VEHICLE MOBILITY COMMUNICATION

(71) Applicant: Honda Motor Co., Ltd., Tokyo (JP)

(72) Inventors: Parivesh Pradhan, Cerritos, CA (US); Siva Nageswararao Chennuri, Torrance, CA (US)

(73) Assignee: Honda Motor Co., Ltd., Tokyo (JP)

(*) Notice: Subject to any disclaimer, the term of this patent is extended or adjusted under 35 U.S.C. 154(b) by 90 days.

(21) Appl. No.: 18/103,160

(22) Filed: Jan. 30, 2023

(65) Prior Publication Data
US 2024/0256249 A1    Aug. 1, 2024

(51) Int. Cl.
*G06F 8/65*    (2018.01)
*G16Y 10/40*   (2020.01)
(Continued)

(52) U.S. Cl.
CPC ............. *G06F 8/65* (2013.01); *G16Y 10/40* (2020.01); *G16Y 20/20* (2020.01); *G16Y 40/35* (2020.01)

(58) Field of Classification Search
CPC .......... G06F 8/65; G16Y 10/40; G16Y 20/20; G16Y 40/35
(Continued)

(56) References Cited

U.S. PATENT DOCUMENTS 10,827,019 B2 * 11/2020 Rubin ............... H04W 12/009
10,834,482 B2   11/2020 Speicher et al.
(Continued)

FOREIGN PATENT DOCUMENTS

CN    102970311    3/2013
CN    110875887    3/2020
(Continued)

OTHER PUBLICATIONS

Darwish, Tasneem SJ, and Kamalrulnizam Abu Bakar. "Fog based intelligent transportation big data analytics in the internet of vehicles environment: motivations, architecture, challenges, and critical issues." IEEE Access 6 (2018): pp. 15679-15701. (Year: 2018).*
(Continued)

*Primary Examiner* — Satish Rampuria
(74) *Attorney, Agent, or Firm* — Rankin, Hill & Clark LLP

(57) ABSTRACT

A system and method for providing enriched connected vehicle mobility communication that include receiving data associated with an operation of at least one of: a vehicle and an Internet of Things (IoT) device. The system and method also include publishing a publish/subscribe (pub/sub) message that pertains to the data associated with the operation of at least one of: the vehicle and the IoT device to an IoT broker that is configured to manage the pub/sub message and communicating the pub/sub message that pertains to the data associated with the operation of at least one of: the vehicle and the IoT device from the IoT broker to at least one subscriber through a Message Queuing Telemetry Transport (MQTT) protocol. The system and method further include electronically controlling the at least one subscriber to present a graphical user interface to present information associated with the pub/sub message communicated through the MQTT protocol.

20 Claims, 6 Drawing Sheets

(51) Int. Cl.
*G16Y 20/20* (2020.01)
*G16Y 40/35* (2020.01)

(58) Field of Classification Search
USPC .................................................. 717/120–178
See application file for complete search history.

(56) References Cited

U.S. PATENT DOCUMENTS

| | | | |
|---|---|---|---|
| 11,411,897 B2* | 8/2022 | Cui | H04L 67/01 |
| 11,588,776 B1* | 2/2023 | Sorenson, III | H04L 51/226 |
| 2018/0091506 A1* | 3/2018 | Chow | H04L 67/567 |
| 2019/0173951 A1* | 6/2019 | Sumcad | H04L 67/55 |
| 2019/0215694 A1* | 7/2019 | Rubin | H04W 4/90 |
| 2020/0344189 A1* | 10/2020 | Cui | H04L 67/55 |
| 2021/0224359 A1 | 7/2021 | Case | |
| 2022/0286522 A1 | 9/2022 | Okino | |
| 2023/0412681 A1* | 12/2023 | Foust | H04L 47/34 |

FOREIGN PATENT DOCUMENTS

| | | |
|---|---|---|
| CN | 113347028 | 9/2021 |
| CN | 114567649 | 5/2022 |
| CN | 115412329 | 11/2022 |
| WO | 2021201305 | 10/2021 |
| WO | 2022184787 | 9/2022 |

OTHER PUBLICATIONS

Al-Turjman, Fadi, and Melih Gunay. "CAR Approach for the Internet of Things." Canadian Journal of Electrical and Computer Engineering 39.1 (2016): pp. 11-18. (Year: 2016).*

Gupta, Maanak, and Ravi Sandhu. "Authorization framework for secure cloud assisted connected cars and vehicular internet of things." Proceedings of the 23nd ACM on symposium on access control models and technologies. 2018.pp. 193-204 (Year: 2018).*

Gerla, Mario, et al. "Internet of vehicles: From intelligent grid to autonomous cars and vehicular clouds." 2014 IEEE world forum on internet of things (WF-IoT). IEEE, 2014. pp. 241-246. (Year: 2014).*

Ushakov, Denis, et al. "The Internet of Things impact on smart public transportation." Transportation Research Procedia 63 (2022): pp. 2392-2400. (Year: 2022).*

Akpakwu, Godfrey Anuga, et al. "A survey on 5G networks for the Internet of Things: Communication technologies and challenges." IEEE access 6 (2017): pp. 3619-3647. (Year: 2017).*

* cited by examiner

SYSTEM AND METHOD FOR PROVIDING ENRICHED CONNECTED VEHICLE MOBILITY COMMUNICATION

BACKGROUND

In connected vehicle systems, vehicle manufacturers may utilize remote services to enable remote engagement between customers and vehicles. In many cases, such remote services are supported by various complex technology platforms that place limitations in providing real-time user engagement with respect to the remote services. In many cases, there are some challenges with respect to interfacing with customers that may be brought on by asynchronous communication based on connectivity limitations. For example, due to a vehicle being in online and offline modes, continuous polling between a remote services client and one or more systems of the vehicle may need to be completed in order to receive remote services updates. This may cause customers to wait for updates with respect to remote services and may preclude real-time remote engagement with the vehicle.

BRIEF DESCRIPTION

According to one aspect, a computer-implemented method for providing enriched connected vehicle mobility communication is provided. The computer-implemented method includes receiving data associated with an operation of at least one of: a vehicle and an Internet of Things (IoT) device. The computer-implemented method also includes publishing a publish/subscribe (pub/sub) message that pertains to the data associated with the operation of at least one of: the vehicle and the IoT device to an IoT broker that is configured to manage the pub/sub message. The computer-implemented method additionally includes communicating the pub/sub message that pertains to the data associated with the operation of at least one of: the vehicle and the IoT device from the IoT broker to at least one subscriber through a Message Queuing Telemetry Transport (MQTT) protocol. The computer-implemented method further includes electronically controlling the at least one subscriber to present a graphical user interface to present information associated with the pub/sub message communicated through the MQTT protocol.

According to another aspect, a system for enriched connected vehicle mobility communication is provided. The system includes a memory that stores that are executed by a processor. The instructions include receiving data associated with an operation of at least one of: a vehicle and an Internet of Things (IoT) device. The instructions also include publishing a publish/subscribe (pub/sub) message that pertains to the data associated with the operation of at least one of: the vehicle and the IoT device to an IoT broker that is configured to manage the pub/sub message. The instructions additionally include communicating the pub/sub message that pertains to the data associated with the operation of at least one of: the vehicle and the IoT device from the IoT broker to at least one subscriber through a Message Queuing Telemetry Transport (MQTT) protocol. The instructions further include electronically controlling the at least one subscriber to present a graphical user interface to present information associated with the pub/sub message communicated through the MQTT protocol.

According to yet another aspect, a non-transitory computer readable storage medium storing instructions that when executed by a computer, which includes a processor performs a method. The method includes receiving data associated with an operation of at least one of: a vehicle and an Internet of Things (IoT) device. The method also includes publishing a publish/subscribe (pub/sub) message that pertains to the data associated with the operation of at least one of: the vehicle and the IoT device to an IoT broker that is configured to manage the pub/sub message. The method additionally includes communicating the pub/sub message that pertains to the data associated with the operation of at least one of: the vehicle and the IoT device from the IoT broker to at least one subscriber through a Message Queuing Telemetry Transport (MQTT) protocol. The method further includes electronically controlling the at least one subscriber to present a graphical user interface to present information associated with the pub/sub message communicated through the MQTT protocol.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
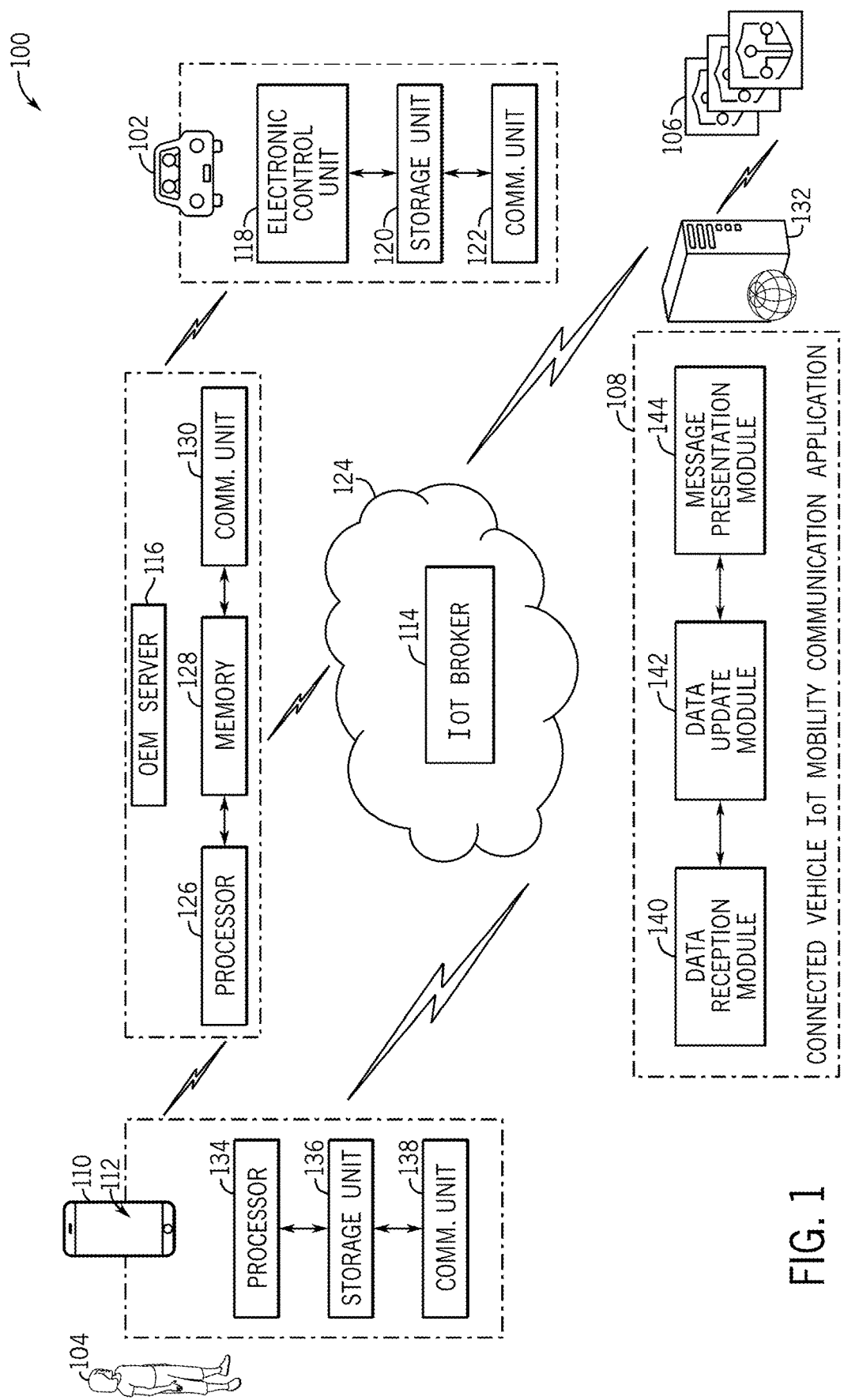
FIG. 1 is a schematic view of an exemplary operating environment of a system for providing enriched connected vehicle mobility communication according to an exemplary embodiment of the present disclosure.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein, can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (EV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" as used herein can include, but is not limited to, a numerical or other kind of value or level such as a percentage, a non-numerical value, a discrete state, a discrete value, a continuous value, among others. The term "value" as used throughout this detailed description and in the claims refers to any numerical or other kind of value for distinguishing between two or more states of X. For example, in some cases, the value may be given as a percentage between 0% and 100%. In other cases, the rating could be a value in the range between 1 and 10. In still other cases, the value may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 is a schematic view of an exemplary operating environment of a system 100 for providing enriched connected vehicle mobility communication according to an exemplary embodiment of the present disclosure. The components of the system 100, as well as components of other systems, hardware architectures and software architectures discussed herein, may be combined, omitted or organized into different architecture for various embodiments. However, the exemplary embodiments discussed herein focus on the system 100 as illustrated in FIG. 1, with corresponding system components, and related methods.

As discussed in more detail below, the system 100 may provide the enriched connected vehicle mobility communication between a vehicle 102 and a user 104 and/or one or more Internet of Things (IoT) devices 106 through a connected vehicle IoT mobility communication application (mobility communication application) 108. The mobility communication application 108 may be configured as an application programming interface (API) that is executed as a client on one or more computing systems. The mobility communication application 108 is configured to provide an interface between the user 104, the vehicle 102, and/or one or more IoT devices 106. In particular, the mobility communication application 108 may be configured to provide a human machine interface (HMI) that enables the user 104 to remotely engage with the vehicle 102 and/or one or more IoT devices 106 to provide remote commands, receive status updates, and/or to provide additional communications.

In one or more embodiments, the mobility communication application 108 may be executed through a mobile device 110 that may be used by the user 104. However, it is appreciated that the mobility communication application 108 may be executed on one or more additional or alternative types of computing devices (e.g., computers, laptops, tablets, mobile phones, etc.) that may be used by the user 104. The mobility communication application 108 may be configured to provide the HMI through one or more graphical user interfaces that enable the user 104 to engage with the vehicle 102 and/or one or more IoT devices 106.

In one configuration, the one or more graphical user interfaces may be presented through a display 112 of the mobile device 110 to allow the user to remotely engage with the vehicle 102 and/or one or more IoT devices 106 through the mobile device 110. In particular, the one or more graphical user interfaces may be configured to provide a virtual remote dashboard that may enable the user 104 to obtain information associated with the vehicle 102 and/or one or more IoT devices 106 and/or remotely engage with the vehicle 102 and/or one or more IoT devices 106.

The one or more graphical user interfaces of the mobility communication application 108 may enable the user 104 to provide one or more remote commands that may be executed by the vehicle 102 and/or one or more IoT devices 106. For example, the graphical user interfaces of the mobility communication application 108 may enable the user 104 to input user interface icons that may send particular remote commands from the mobile device 110 to be executed by the vehicle 102 and/or one or more IoT devices 106. Such commands may include, but may not be limited to, a remote vehicle start function, a remote vehicle lock/unlock function, a remote alarm activation/deactivation function, a remote HVAC control function, a remote vehicle location tracking function, a remote vehicle data fetching function, a remote garage door open/close function, a remote home automation control function, and the like.

The one or more graphical user interfaces of the mobility communication application 108 may also enable the user 104 to receive updates associated with one or more functions and/or systems of the vehicle 102 and/or the one or more IoT devices 106. For example, the graphical user interfaces of the mobility communication application 108 may enable the user 104 to view status update information associated with a real-time location of the vehicle 102, a fuel/battery charge level of the vehicle 102, a lock/unlock status of doors of the vehicle 102, a trip mileage of the vehicle 102, a lifetime mileage of the vehicle 102, a garage door status of a garage door opener, an operational status of a home automation control function (e.g., lighting ON/OFF, HVAC Mode/Temperature), and the like.

In some embodiments, the mobility communication application 108 may also enable the user 104 to opt in or opt out of permissions associated with inputting one or more remote commands that may be executed by the vehicle 102 and/or one or more IoT devices 106. Additionally, the mobility communication application 108 may also enable the user 104 to opt in or opt out of permissions associated with receiving updates associated with one or more functions and/or systems of the vehicle 102 and/or the one or more IoT devices 106.

As discussed below, the system 100 may facilitate the efficient communication of data to provide the user 104 with real-time engagement with the vehicle 102 and/or one or more IoT devices 106. In particular, the system 100 may utilize a publisher subscriber model to facilitate communications between the user 104 and the vehicle 102 and/or the one or more IoT devices 106 through the mobility communication application 108 to ensure efficient asynchronous communication of data from the vehicle 102 to the mobile device 110 and from one or more IoT devices 106 to the mobile device 110.

As discussed in more detail below, the system 100 may utilize a Message Queuing Telemetry Transport (MQTT) protocol as a publish/subscribe machine to machine messaging protocol to facilitate a lightweight resource efficient publisher subscriber model to complete publish/subscribe communication of MQTT pub/sub messages. The MQTT pub/sub messages may be published with data that is associated with the vehicle 102 and/or one or more IoT devices 106 to be sent to the mobile device 110 and accessed by the user 104 though the one or more graphical user interfaces of the mobility communication application 108.

In one embodiment, an OEM server 116 may be configured as a publisher to complete publish/subscribe communication of MQTT pub/sub messages to be published to an IoT broker 114 of the system 100. The IoT broker 114 is accordingly configured as a medium that is configured to manage the MQTT pub/sub messages between the publisher OEM server 116 that publishes the MQTT pub/sub messages to the IoT broker 114 and one or more subscribers. In an exemplary embodiment, the mobile device 110 used by the user 104 may be configured as a subscriber of the publisher subscriber model. As a subscriber, the mobile device 110 may be configured to instantaneously receive the MQTT pub/sub messages that include the data associated with the vehicle 102 and/or one or more IoT devices 106 that are output and communicated from the IoT broker 114 through the internet cloud 124.

In alternate embodiments, one or more additional computing systems (not shown) may also be included as additional subscribers. In other words, the mobile device 110 and/or one or more additional computing systems that are executing the mobility communication application 108 and are presenting the one or graphical user interfaces of the application 108 may be configured as subscribers that receive MQTT pub/sub messages from the IoT broker 114 that have been published to the IoT broker 114 by the publisher OEM server 116. Accordingly, one or more graphical user interfaces of the mobility communication application 108 that may be presented through the display 112 of the mobile device 110 or through one or more additional computing systems that are executing the mobility communication application 108 may be updated in real-time to present the user 104 with information that is associated with the vehicle 102 and/or one or more IoT devices 106 based on instantaneous receipt of the MQTT pub/sub messages output by the IoT broker 114.

As discussed above, the one or more graphical user interfaces of the mobility communication application 108 may enable the user 104 to provide one or more remote commands that may be executed by the vehicle 102 and/or one or more IoT devices 106. In an exemplary embodiment, MQTT over SSL may be utilized to allow the communication of data that may associated with the execution of one or more remote commands from the vehicle 102 to an OEM server 116 to be published as a MQTT pub/sub message on the IoT broker 114.

Accordingly, as a subscriber, the mobile device 110 and/or one or more additional computing systems may be configured to instantaneously receive the MQTT pub/sub message that may be associated with the execution of one or more remote commands to be presented to the user 104 through one or more graphical user interfaces of the mobility communication application 108. As such, the user 104 may be able to receive confirmation of the execution of one or more remote commands by the vehicle 102 and/or one or more IoT devices 106 in real-time upon using the application 108 to input such remote commands through the mobile device 110.

Additionally, as discussed, one or more graphical user interfaces of the mobility communication application 108 may also enable the user 104 to receive updates associated with one or more functions and/or systems of the vehicle 102 and/or the one or more IoT devices 106. MQTT over SSL may be utilized to allow communication of data that may pertain to one or more updates that may be associated with one or more functions and/or systems of the vehicle 102 and/or the one or more IoT devices 106 to the OEM server 116 to be published as a pub/sub message on the IoT broker 114. As such, the user 104 may be able to receive information that may pertain to one or more updates that may be associated with one or more functions and/or systems of the vehicle 102 and/or the one or more IoT devices 106 in real-time upon using the application 108 through the mobile device 110.

This functionality may provide an improvement to the technology of connected vehicle systems by providing instantaneous messaging capability to communicate the execution one or more remote commands to the vehicle 102 and/or to one or more IoT devices 106 and/or to communicate status updates from the vehicle 102 and/or one or more IoT devices 106 to subscribers through a backend IoT broker platform that provides a simple messaging protocol which uses simple publish/subscribe message communication. This functionality also minimizes the need for data to be pulled from client devices, applications associated with the vehicle 102, and/or applications associated with one or more IoT devices 106. Accordingly, there may be a decrease in overhead with respect to a number of API calls and event messages that may be queued up from the OEM server 116 to various vehicles and end users using respective computing devices. Additionally, operational overhead and infrastructure costs that may be attributed to the OEM and/or one or more third parties may be minimized.

The functionality of using MQTT over SSL may consequently enable the mobility communication application 108 to obtain and present remote command execution information and/or status information to the user 104 without having to poll and wait for messages to be queued and released. This may result in a reduction of chatty network traffic to and from the OEM server 116 which may thereby minimize the number and use of server resources. Additionally, the functionality of utilizing the IoT broker 114 to publish MQTT pub/sub messages to subscribers including the mobile device 110 may thereby allow the user 104 to receive information associated with the vehicle 102 and/or one or more IoT devices 106 in real-time, rather than having to wait for such information to be queued up from the OEM server 116 based on the online or offline status of the vehicle 102 and/or one or more IoT devices 106. Accordingly, the system 100 uses MQTT as a lightweight messaging protocol that minimizes resource constraints with respect to network clients and provides simple communication mechanism between the user 104 and the vehicle 102 and/or one or more IoT devices 106.

II. System Component Overview

With continued reference to FIG. 1, the vehicle 102 may include an electronic control unit (ECU) 118, a storage unit 120, and a communication unit 122. It is to be appreciated that the vehicle 102 additionally includes a plurality of additional electronic and mechanical components, systems, and sub-systems that are not shown or described in detail herein. In an exemplary embodiment, the ECU 118 may be configured to electronically communicate one or more commands, functions, and/or features that are to be executed by one or more electronic and mechanical components, systems, and sub-systems of the vehicle 102. The ECU 118 may also be configured to execute one or more applications, operating systems, vehicle system and subsystem user interfaces, among others.

In one embodiment, the ECU 118 may also be configured to execute the mobility communication application 108 and may be configured to communicate one or more commands to the one or more electronic and mechanical components, systems, and sub-systems of the vehicle 102 based on one or more remote commands that may be provided by the user inputs that are provided through the one or more graphical user interfaces of the mobility communication application 108 by the user 104 through the mobile device 110 and/or one or more additional computing systems.

In one configuration, upon the execution of one or more commands by the one or more electronic and mechanical components, systems, and sub-systems of the vehicle 102, the ECU 118 may be configured to store associated data on the storage unit 120 of the vehicle 102 and may control the communication unit 122 of the vehicle 102 to communicate data that pertains to the execution of the one or more remote commands to the OEM server 116 of the system 100. Such data may be published as a MQTT pub/sub message from the publisher OEM server 116 to the IoT broker 114 to be output and communicated to one or more subscribers including the mobile device 110 to update the user 104 that the one or more remote commands have been executed.

In one embodiment, the ECU 118 may also be configured to communicate one or more commands to the one or more electronic and mechanical components, systems, and sub-systems of the vehicle 102 to receive one or more status updates that pertain to one or more functions and/or systems of the vehicle 102. In one configuration, upon receiving of one or more status updates by the ECU 118 from the one or more electronic and mechanical components, systems, and sub-systems of the vehicle 102, the ECU 118 may be configured to store associated data on the storage unit 120 of the vehicle 102 and may control the communication unit 122 of the vehicle 102 to communicate data that pertains to the status updates to the OEM server 116 of the system 100. Such data may be published as a MQTT pub/sub message from the publisher OEM server 116 on the IoT broker 114 to be output and communicated to one or more subscribers including the mobile device 110 to update the user 104 with respect to one or more status updates that are associated with the vehicle 102.

According to one aspect, the storage unit 120 may include one or more types of memory devices and may be configured to store one or more executable files that may be associated with the mobility communication application 108 and/or additional applications and data that may be executed by the ECU 118. The storage unit 120 may be utilized to store data associated with one or more remote commands, the execution of one or more remote commands, and/or one or more status updates. In some configurations, the mobility communication application 108 may be configured to receive such data from the ECU 118 or retrieve such data from the storage unit 120 and may utilize the communication unit 122 to communicate respective data to the OEM server 116.

In an exemplary embodiment, the communication unit 122 of the vehicle 102 may be configured to connect to an internet cloud 124 to send and receive communication signals to and from the OEM server 116. The communication unit 122 may be configured to communicate through the internet cloud 124 through one or more wireless communication signals that may include, but may not be limited to Bluetooth® signals, Wi-Fi signals, ZigBee signals, Wi-Max signals, and the like. In one embodiment, the communication unit 122 may be configured to connect to the internet cloud 124 to receive communication signals that include data that is associated with the one or more remote commands that may be inputted by the user 104 through the mobile device 110.

The communication unit 122 may also be configured to connect to the internet cloud 124 to send communication signals that include data associated with one or more status updates based on user inputted remote commands that may be executed by the vehicle 102 and/or status updates that may be associated with functions and/or systems of the vehicle 102. As discussed below, such data may be published as a MQTT pub/sub message from the publisher OEM server 116 to the IoT broker 114 to be output and communicated to the user 104 through the mobile device 110.

In an exemplary embodiment, the OEM server 116 may be owned and/or managed by a vehicle manufacturer (OEM). In additional embodiments, a third-party that may be associated with the OEM may own and/or manage the OEM server 116. The OEM server 116 may be used to send/receive data that may be associated with vehicles that are manufactured by the OEM. As such, data associated with one or more remote commands that are provided through the mobility communication application 108, one or more status updates that are provided by the vehicle 102, software updates that may be provided to one or more systems, sub-systems of the vehicle 102, and/or additional information related to the vehicle 102 may be managed through the OEM server 116 to be sent to the ECU 118 of the vehicle 102 and/or to the mobile device 110 to be presented to the user 104.

The OEM server 116 may be operably controlled by a processor 126. The processor 126 may be configured to execute the mobility communication application 108. The processor 126 may be operably connected to a memory 128 of the OEM server 116. The memory 128 may store one or more operating systems, applications, associated operating system data, application data, executable data, and the like. In one embodiment, the memory 128 may be configured to store data associated with one or more remote commands, the execution of one or more remote commands, and/or one or more status updates as received from the mobile device 110 and/or the vehicle 102.

In one embodiment, the processor 126 of the OEM server 116 may additionally be configured to communicate with a communication unit 130 of the OEM server 116. The communication unit 130 may be configured to communicate through the internet cloud 124 through one or more wireless communication signals that may include, but may not be limited to Bluetooth® signals, Wi-Fi signals, ZigBee signals, Wi-Max signals, and the like. In one embodiment, the communication unit 122 may be configured to connect to the internet cloud 124 to send and receive communication signals to and from the mobile device 110 and/or the vehicle 102.

The communication signals may include data that is associated with the one or more remote commands that may be inputted by the user 104 through the mobile device 110. Additionally, the communication signals may include data that is associated with one or more status updates of user inputted remote commands that may be executed by the vehicle 102 and/or status updates that may be associated with functions and/or systems of the vehicle 102. The mobility communication application 108 may be configured to utilize the communication unit 130 of the OEM server 116 to connect to the internet cloud 124 to publish the data as a MQTT pub/sub message to the IoT broker 114. Accordingly, the communication unit 130 may facilitate the publishing of MQTT pub/sub messages that include the vehicle status information from the OEM server 116 as a publisher to the IoT broker 114 to be further output and communicated to one or more subscribers.

In one or more embodiments, the communication unit 130 of the OEM server 116 may also be configured to connect to the internet cloud 124 to send and/or receive data to and/or from a third-party externally hosted computing infrastructure (external computing infrastructure) 132. The external computing infrastructure 132 may include one or more computing systems (e.g., servers) that may be managed by one or more third-party entities that may include, but may not be limited to manufacturers of one or more IoT devices 106, one or more entities that manage communications between one or more IoT devices 106 and additional computing systems, and/or the OEM.

In one embodiment, the external computing infrastructure 132 may be configured to manage interfacing and functionality with respect to the one or more IoT devices 106. The external computing infrastructure 132 may accordingly be configured to send and/or receive data to and/or from the one or more IoT devices 106. Such data may include, but may not be limited to, one or more remote commands that may be input by the user 104 through the mobile device 110, one or more status updates of remote commands that may be executed by respective IoT devices 106 and/or status updates that may be associated with functions and/or systems of respective IoT devices 106.

The one or more IoT devices 106 may include various types and configurations of electrical and/or mechanical devices. For example, the one or more IoT devices 106 may include, but may not be limited to, a garage door opener, a smart appliance, a home automation component, connected home network, an electric controller/grid, and the like. In one embodiment, the one or more IoT devices 106 may send status updates in the form of data that pertains to the updating of one or more functions of the IoT devices 106 to the external computing infrastructure 132.

As discussed below, the external computing infrastructure 132 may be configured to communicate such data to and from the OEM server 116. For example, one or more status updates of user inputted remote commands that may be executed by respective IoT devices 106 and/or status updates that may be associated with functions and/or systems of respective IoT devices 106 may be communicated by the external computing infrastructure 132 to the OEM server 116 through the internet cloud 124. The OEM server 116 may be configured publish such data as a MQTT pub/sub message to the IoT broker 114.

In particular, the mobility communication application 108 may be configured to utilize the communication unit 130 of the OEM server 116 to connect to the internet cloud 124 to publish the data as a MQTT pub/sub message to the IoT broker 114. Accordingly, the communication unit 130 may facilitate the publishing of MQTT pub/sub messages that include IoT device status information from the OEM server 116 as a publisher to the IoT broker 114 to be further output and communicated to one or more subscribers.

In an exemplary embodiment, the mobile device 110 may be operably controlled by a processor 134. The processor 134 may be configured to execute the mobility communication application 108. Upon executing the mobility communication application 108, the display 112 of the mobile device 110 may be operably controlled to present the one or more graphical user interfaces of the application 108 to the user 104 to provide inputs associated with one or more remote commands to the vehicle 102 and/or one or more IoT devices 106, to receive status updates associated with the execution of one or more remote commands by the vehicle 102 and/or one or more IoT devices 106, and/or to receive status updates based on functions and/or systems of the vehicle 102 and/or functions of one or more IoT devices 106.

The processor 126 may be operably connected to a storage unit 136 of the mobile device 110. The storage unit 136 may store one or more operating systems, applications, associated operating system data, application data, executable data, and the like. In one embodiment, the storage unit 136 may be configured to store data associated with one or more remote commands that may be inputted by the user 104 through the mobile device 110 and/or data associated with the execution of one or more remote commands, and/or one or more status updates as received as MQTT pub/sub messages from the IoT broker 114.

In one embodiment, the processor 134 of the mobile device 110 may additionally be configured to communicate with a communication unit 138 of the mobile device 110. The communication unit 138 may be configured to communicate through the internet cloud 124 through one or more wireless communication signals that may include, but may not be limited to Bluetooth® signals, Wi-Fi signals, ZigBee signals, Wi-Max signals, and the like. As a subscriber of the publisher subscriber model of the system 100, the processor 134 may operably control the communication unit 138 to connect to the internet cloud 124 to obtain MQTT pub/sub messages that are output and communicated by the IoT broker 114. As discussed, the MQTT pub/sub messages may include status updates associated with the execution of one or more remote commands and/or one or more status updates associated with functions and/or systems of the vehicle 102 and/or functions of one or more IoT devices 106 to be presented to the user 104 through the one or more graphical user interfaces of the mobility communication application 108 through the display 112 of the mobile device 110.

The communication unit 138 may be additionally configured to connect to the internet cloud 124 to send communication signals to the OEM server 116 that are associated with one or more remote commands that are inputted by the user 104 to be executed by the vehicle 102 and/or one or more IoT devices 106 through one or more graphical user interfaces of the mobility communication application 108. In an alternate embodiment, the communication unit 138 may also be configured to connect to the internet cloud 124 to send communication signals to the external computing infrastructure 132 that are associated with one or more remote commands that are inputted by the user 104 to be executed by one or more IoT devices 106 through one or more graphical user interfaces of the mobility communication application 108.

In an exemplary embodiment, the IoT broker 114 may be hosted on any cloud platform and may be configured as a middleware infrastructure or a hub that may be configured to receive MQTT pub/sub messages from the publisher and decode the MQTT pub/sub messages to be output and communicated to one or more subscribers. Stated with respect to the system 100, as represented in FIG. 1, the IoT broker 114 may be configured to manage MQTT pub/sub messages that are published by the OEM server 116 to be decoded to be output and communicated to the mobile device 110 and/or one or more additional computing systems that are configured as subscribers. In some embodiments, the IoT broker 114 may be configured to filter and send a plurality of messages in sequence that may be published by the OEM server 116 to be sent in a sequence to the mobile device 110. Accordingly, through the instantaneous updating of one or more graphical user interfaces of the mobility communication application 108 based on the receipt of MQTT pub/sub messages, the user 104 may receive status updates that may relate to the vehicle 102 and/or one or more IoT devices 106 in real-time without the application 108 having to poll the OEM server 116 and wait for messages to be queued and released.

III. The Connected Vehicle IoT Mobility Communication Application and Related Methods The components of the mobility communication application 108 will now be described according to an exemplary embodiment and with reference to FIG. 1. In an exemplary embodiment, the mobility communication application 108 may be stored on the storage unit 136 of the mobile device 110, the memory 128 of the OEM server 116, and/or the storage unit 120 of the vehicle 102. The mobility communication application 108 may be executed by the mobile device 110, the OEM server 116, and/or the vehicle 102.

The general functionality of the mobility communication application 108 will now be discussed. In an exemplary embodiment, the mobility communication application 108 may include a data reception module 140, a data update module 142, and a message presentation module 144. However, it is to be appreciated that the mobility communication application 108 may include one or more additional modules and/or sub-modules that are included in addition to the modules 140-144. Methods and examples describing process steps that are executed by the modules 140-144 of the mobility communication application 108 will now be described in more detail.

Figure 2:
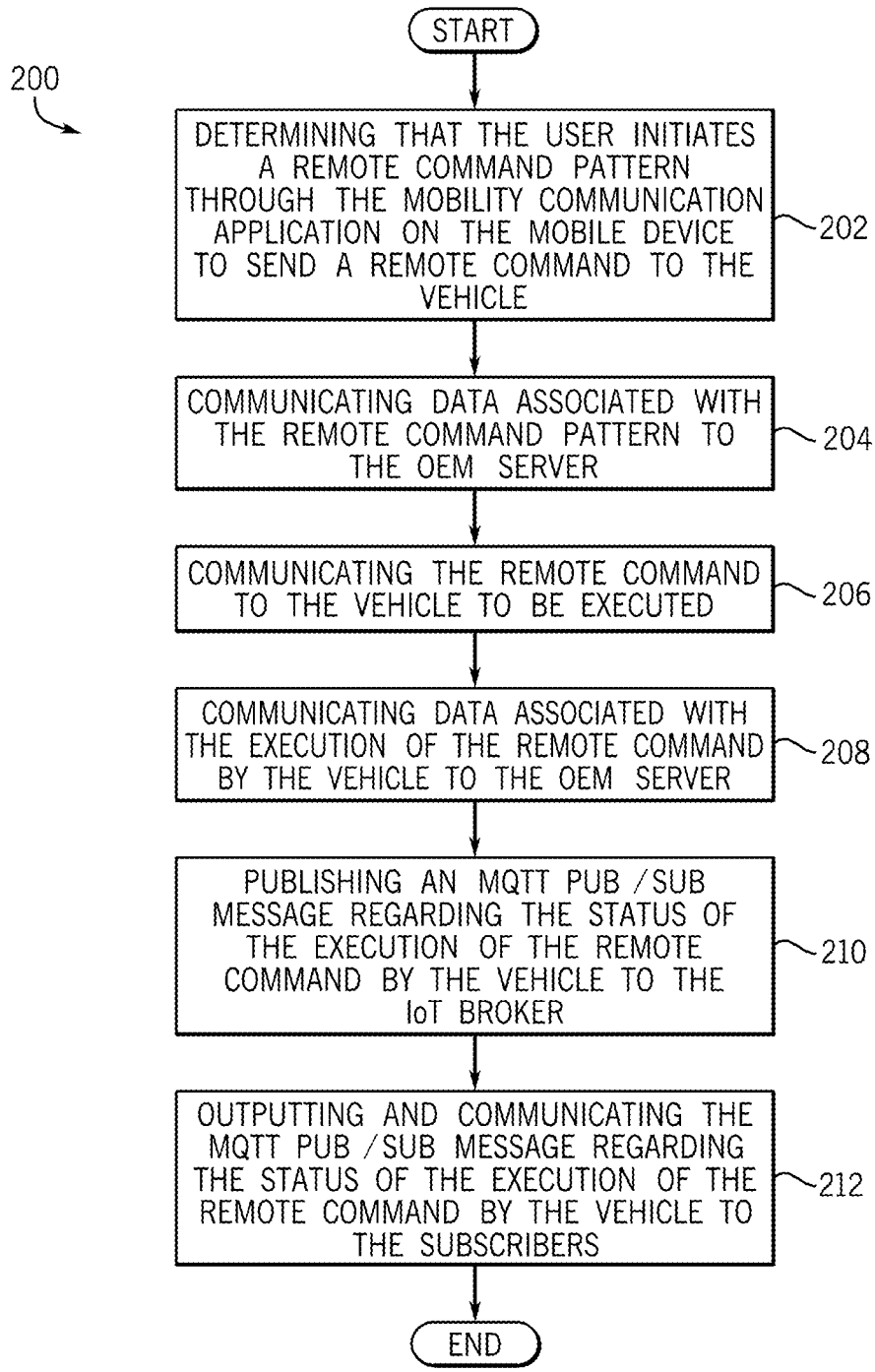
FIG. 2 is a process flow diagram of a method for completing a user initiated remote command to the vehicle according to an exemplary embodiment of the present disclosure.

FIG. 2 is a process flow diagram of a method 200 for completing a user initiated remote command to the vehicle 102 according to an exemplary embodiment of the present disclosure. FIG. 2 will be described with reference to the components of FIG. 1, though it is to be appreciated that the method 200 of FIG. 2 may be used with other systems/components. The method 200 will be described with respect to electronic communications of the publisher subscriber model of the system 100 occurring between the OEM server 116 as a publisher, the IoT broker 114, and the mobile device 110 as a subscriber. However, it is to be appreciated that one or more additional computing systems that are configured as subscribers may be used in addition to or in lieu of the mobile device 110 to execute the method 200 of FIG. 2.

The method 200 may begin at block 202, wherein the method 200 may include determining that the user 104 initiates a remote command pattern through the mobility communication application 108 on the mobile device 110 to send a remote command to the vehicle 102. As discussed above, the mobility communication application 108 may present one or more graphical user interfaces through the display 112 of the mobile device 110. The one or more graphical user interfaces may enable the user 104 to input user interface icons that may send particular remote commands from the mobile device 110 to be executed by the vehicle 102. Such commands may include, but may not be limited to, a remote vehicle start function, a remote vehicle lock/unlock function, a remote alarm activation/deactivation function, a remote HVAC control function, a remote vehicle location tracking function, a remote vehicle data fetching function, and the like.

In one embodiment, upon receiving a user input on one of the user interface icons that pertain to particular remote commands to be executed by the vehicle 102, the data reception module 140 of the mobility communication application 108 may analyze the user input and the associated remote command and may determine that the user 104 has initiated a remote command pattern to send particular remote commands from the mobile device 110 to be executed by the vehicle 102 from the API. Upon determining that the user 104 has initiated the remote command pattern, the data reception module 140 may be configured to communicate data pertaining to the remote command to the data update module 142 of the mobility communication application 108.

In one or more embodiments, upon determining that the user 104 has initiated the remote commands pattern, the data update module 142 may communicate with the processor 134 to operably control the communication unit 138 of the mobile device 110 to connect to the internet cloud 124 and to communicate with the IoT broker 114 as a subscriber of the publisher subscriber model of the system 100 to receive any MQTT pub/sub messages over MQTT (e.g., over SSL or HTTPS) through the internet cloud 124. In some configurations, the IoT broker 114 may electronically communicate a response signal to the mobile device 110 that acknowledges the mobile device 110 as a subscriber that is configured to receive pub/sub messages over MQTT that are outputted and communicated by the IoT broker 114.

The method 200 may proceed to block 204, wherein the method 200 may include communicating data associated with the remote command pattern to the OEM server 116. In an exemplary embodiment, the data update module 142 may be configured to utilize the communication unit 138 of the mobile device 110 to send the data pertaining to the remote command inputted by the user 104 through the one or more graphical user interfaces to the communication unit 130 of the OEM server 116. Accordingly, data associated with the remote command inputted by the user 104 through the one or more graphical user interfaces of the mobility communication application 108 may be communicated from the mobile device 110 to the OEM server 116 through the internet cloud 124 to be analyzed by the processor 126 of the OEM server 116. Based on the analysis of the data by the processor 126, the processor 126 may be configured to authenticate and authorize the data that pertains to a remote command to the vehicle 102 that is associated with the OEM.

In one configuration, upon authentication and authorization of the data that pertains to the remote command, the processor 126 may send an authorization response to the data reception module 140. In some configurations, the processor 126 may utilize the communication unit 130 to send the authorization response back to the communication unit 138 of the mobile device 110 to be received by the data reception module 140.

The method 200 may proceed to block 206, wherein the method 200 may include communicating the remote command to the vehicle 102 to be executed. In an exemplary embodiment, upon the processor 126 of the OEM server 116 authenticating and authorizing the data, the data update module 142 may utilize the communication unit 130 of the OEM server 116 to connect to the internet cloud 124 to communicate the data pertaining to the user inputted remote command to the communication unit 122 of the vehicle 102 to be analyzed by the ECU 118 of the vehicle 102.

The method 200 may proceed to block 208, wherein the method 200 may include communicating data associated with the execution of the remote command by the vehicle 102 to the OEM server 116. In one embodiment, upon the analysis of the data pertaining to the user inputted remote command, the ECU 118 may be configured to electronically communicate one or more commands that pertain to the remote commands to one or more electronic and mechanical components, systems, and sub-systems of the vehicle 102 to be executed. For example, if the remote command includes a command to lock the doors of the vehicle 102, the ECU 118 may be configured to send the command to an electronic locking mechanism of the vehicle 102 to lock the doors of the vehicle 102 based on the user inputted remote command (inputted through the mobile device 110).

In one embodiment, the data update module 142 may utilize the ECU 118 to operably control the communication unit 122 of the vehicle 102 to connect to the internet cloud 124 to send data that pertains to a command execution status to the communication unit 130 of the OEM server 116. Accordingly, the OEM server 116 may obtain data that pertains to a status of the execution of the remote command by the vehicle 102.

The method 200 may proceed to block 210, wherein the method 200 may include publishing an MQTT pub/sub message regarding the status of the execution of the remote command by the vehicle 102 to the IoT broker 114. In an exemplary embodiment, the data update module 142 may be configured to utilize the processor 126 of the OEM server 116 to operably control the communication unit 130 to connect to the internet cloud 124 and publish an MQTT pub/sub message as a publisher within the publisher subscriber model to the IoT broker 114. The MQTT pub/sub message published to the IoT broker 114 may include the status of the execution of the remote command by the vehicle 102 based on the data communicated from the vehicle 102 to the OEM server 116. As discussed above, the IoT broker 114 may act as a medium between the publisher OEM server 116 that publishes the MQTT pub/sub messages to the IoT broker 114 and subscribers such as the mobile device 110 that receive the MQTT pub/sub messages from the IoT broker 114.

The method 200 may proceed to block 212, wherein the method 200 may include outputting and communicating the MQTT pub/sub message regarding the status of the execution of the remote command by the vehicle 102 to the subscribers. In an exemplary embodiment, the IoT broker 114 may be configured to output and communicate the MQTT pub/sub message regarding the status of the execution of the remote command by the vehicle 102 to the subscribers of the publisher subscriber model of the system 100. Accordingly, the data update module 142 may utilize the processor 134 of the mobile device 110 to operably control the communication unit 138 to instantaneously receive the MQTT pub/sub message regarding the status of the execution of the remote command by the vehicle 102 as communicated by the IoT broker 114.

In an exemplary embodiment, upon the receipt of the MQTT pub/sub message regarding the status of the execution of the remote command by the communication unit 138 of the mobile device 110, the data update module 142 may communicate data associated with the receipt of the MQTT pub/sub message by the mobile device 110 as communicated from the IoT broker 114 to the message presentation module 144 of the mobility communication application 108.

The message presentation module 144 may be configured to update the one or more graphical user interfaces with information that may be associated with the MQTT pub/sub message indicating the status of the execution of the remote command by the vehicle 102. Accordingly, the user 104 may be presented with an indication of the status of the execution of the remote command that has been inputted by the user 104 through the mobile device 110 (as determined at block 202). As such, through the use of publish/subscribe communication with the MQTT pub/sub message, the user 104 may be able to receive confirmation of the execution of one or more remote commands by the vehicle 102 in real-time upon using the application 108 to input such remote commands through the mobile device 110.

In one configuration, upon presentation of the one or more graphical user interfaces with information that may be associated with the MQTT pub/sub message, the message presentation module 144 may be configured to determine if the user 104 is no longer accessing and using the mobility communication application 108 on the mobile device 110 to engage with the vehicle 102. If it is determined that the user 104 is no longer accessing and using the mobility communication application 108 on the mobile device 110, the message presentation module 144 may communicate with the communication unit 138 to close the connection to IoT broker 114 through the internet cloud 124 until a further use of the mobility communication application 108. In some configurations, the IoT broker 114 may be configured to send a confirmatory response to the mobile device 110 regarding the closing of the connection between the mobile device 110 and the IoT broker 114.

Figure 3:
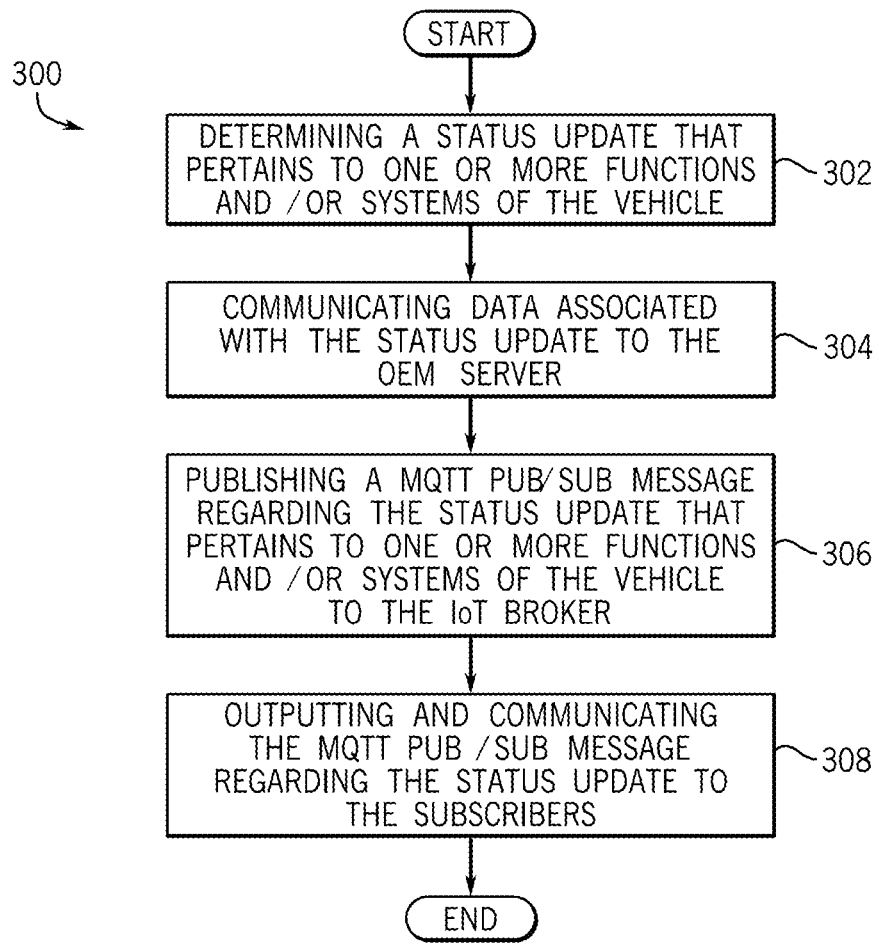
FIG. 3 is a process flow diagram of a method for completing a vehicle initiated streaming pattern according to an exemplary embodiment of the present disclosure.

FIG. 3 is a process flow diagram of a method 300 for completing a vehicle initiated streaming pattern according to an exemplary embodiment of the present disclosure. FIG. 3 will be described with reference to the components of FIG. 1, though it is to be appreciated that the method 300 of FIG. 3 may be used with other systems/components. The method 300 will be described with respect to electronic communications of publisher subscriber model of the system 100 occurring between the OEM server 116 as a publisher, the IoT broker 114, and the mobile device 110 as a subscriber. However, it is to be appreciated that one or more additional computing systems that are configured as subscribers may be used in addition to or in lieu of the mobile device 110 to execute the method 300 of FIG. 3 and that the method 300 may also be implemented with respect to one or more IoT devices 106.

The method 300 may begin at block 302, wherein the method 300 may include determining a status update that pertains to one or more functions and/or systems of the vehicle 102. In an exemplary embodiment, the data reception module 140 of the mobility communication application 108 may communicate with the ECU 118 of the vehicle 102 to provide data associated updates that pertain to one or more functions and/or systems of the vehicle 102. For example, such updates may be associated with a real-time location of the vehicle 102, a fuel/battery charge level of the vehicle 102, a lock/unlock status of doors of the vehicle 102, a trip mileage of the vehicle 102, a lifetime mileage of the vehicle 102, and the like.

In one configuration, as the data is being communicated by the ECU 118 to the data reception module 140, the data update module 142 of the mobility communication application 108 may be configured to utilize the processor 134 to operably control the communication unit 138 of the mobile device 110 to send an on demand device status sync request via an API call to the OEM server 116. In one configuration, the mobile device 110 may enable the OEM server 116 to perform an entitlement check and accept the request for one or more status updates that pertain to one or more functions and/or systems of the vehicle 102.

The method 300 may proceed to block 304, wherein the method 300 may include communicating data associated with the status update to the OEM server 116. In one embodiment, upon receiving data from the ECU 118 that is associated with updates that pertain to one or more functions and/or systems of the vehicle 102, the data update module 142 may utilize the ECU 118 to operably control the communication unit 122 of the vehicle 102 to connect to the internet cloud 124 to send data that pertains to the updated status to the communication unit 130 of the OEM server 116. Accordingly, the OEM server 116 may obtain data that pertains to the updating of one or more functions and/or systems of the vehicle 102. As an example, upon communicating data associated with the update of a location of the vehicle 102 by the ECU 118 to the data reception module 140, the ECU 118 may operably control the communication unit 122 of the vehicle 102 to communicate data associated with the update of the location to the OEM server 116.

The method 300 may proceed to block 306, wherein the method 300 may include publishing an MQTT pub/sub message regarding the status update that pertains to one or more functions and/or systems of the vehicle 102 to the IoT broker 114. In an exemplary embodiment, the data update module 142 may be configured to utilize the processor 126 of the OEM server 116 to operably control the communication unit 130 to connect to the internet cloud 124 and publish an MQTT pub/sub message as a publisher within the publisher subscriber model. The MQTT pub/sub message published to the IoT broker 114 may include information that is associated with the updates that pertain to one or more functions and/or systems of the vehicle 102 based on the data communicated from the vehicle 102 to the OEM server 116.

The method 300 may proceed to block 308, wherein the method 300 may include outputting and communicating the MQTT pub/sub message regarding the status update to the subscribers. In an exemplary embodiment, the IoT broker 114 may be configured to output and communicate the MQTT pub/sub message regarding the updates that pertain to one or more functions and/or systems of the vehicle 102 to the subscribers of the publisher subscriber model of the system 100. Accordingly, the data update module 142 may utilize the processor 134 of the mobile device 110 to operably control the communication unit 138 to instantaneously receive the MQTT pub/sub message regarding the updates that pertain to one or more functions and/or systems of the vehicle 102 as communicated by the IoT broker 114.

In an exemplary embodiment, upon the receipt of the MQTT pub/sub message regarding the updates that pertain to one or more functions and/or systems of the vehicle 102 by the communication unit 138 of the mobile device 110, the data update module 142 may communicate data associated with the receipt of the MQTT pub/sub message by the mobile device 110 as communicated from the IoT broker 114 to the message presentation module 144 of the mobility communication application 108.

The message presentation module 144 may be configured to update the one or more graphical user interfaces with information that may be associated with the MQTT pub/sub message indicating the updates that pertain to one or more functions and/or systems of the vehicle 102. Accordingly, the user 104 may be presented with an indication of the updates that pertain to one or more functions and/or systems of the vehicle 102 (e.g., real-time indication of a location of the vehicle 102). As such, through the use of publish/subscribe communication with the MQTT pub/sub message, the user 104 may be able to receive updates that pertain to one or more functions and/or systems of the vehicle 102 in real-time upon using the application 108 to determine such information through the mobile device 110.

Figure 4:
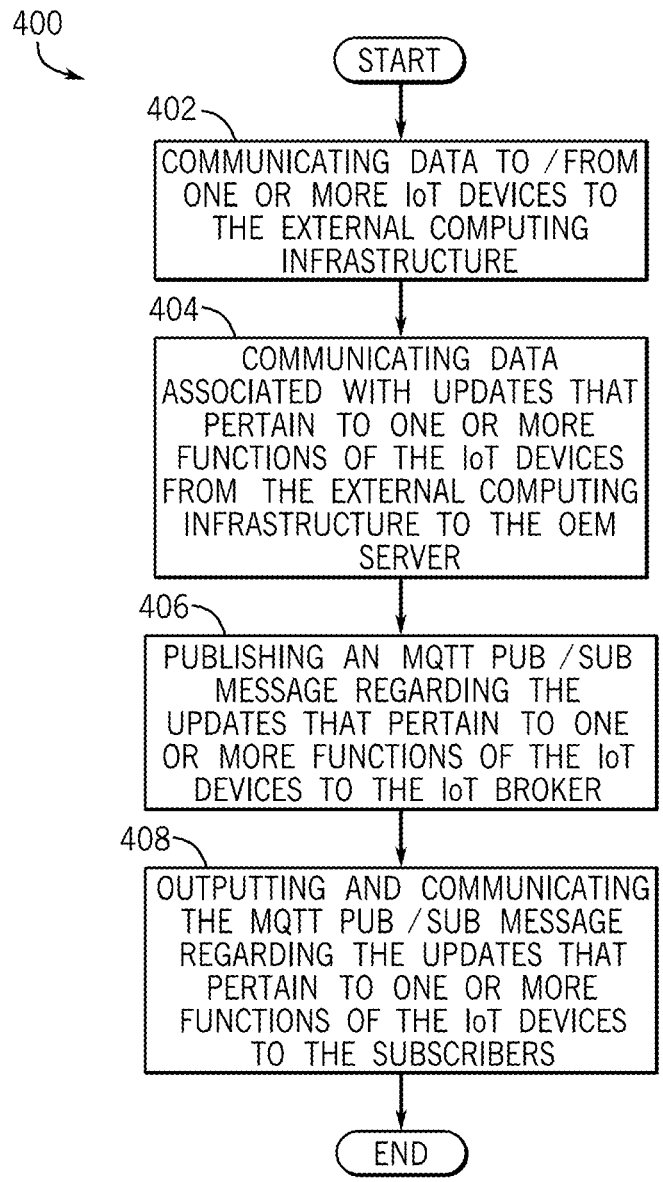
FIG. 4 is a process flow diagram of a method for completing an IoT device initiated streaming pattern according to an exemplary embodiment of the present disclosure.

FIG. 4 is a process flow diagram of a method 400 for completing an IoT device initiated streaming pattern according to an exemplary embodiment of the present disclosure. FIG. 4 will be described with reference to the components of FIG. 1, though it is to be appreciated that the method 400 of FIG. 4 may be used with other systems/components. The method 400 will be described with respect to electronic communications of publisher subscriber model of the system 100 occurring between the OEM server 116 as a publisher, the IoT broker 114, and the mobile device 110 as a subscriber. However, it is to be appreciated that one or more additional computing systems that are configured as subscribers may be used in addition to or in lieu of the mobile device 110.

The method 400 may begin at block 402, wherein the method 400 may include communicating data to/from one or more IoT devices to the external computing infrastructure 132. In an exemplary embodiment, the data reception module 140 of the mobility communication application 108 may communicate with the one or more IoT devices 106 to provide data associated with updates that pertain to one or more functions of the IoT devices 106. For example, such updates may be associated with a function of a garage door opener, a function of a smart appliance, a function of a home automation component, a function of a connected home network, a function of an electric controller/grid, and the like.

In one configuration, as the data is being communicated by one or more IoT devices 106 to the data reception module 140, the data update module 142 of the mobility communication application 108 may be configured to utilize the processor 134 to operably control the communication unit 138 of the mobile device 110 to send an on demand device status sync request via an API call to the OEM server 116. In one configuration, the mobile device 110 may enable the OEM server 116 to perform an entitlement check and accept the request for one or more status updates that pertain to one or more functions of the one or more IoT devices 106.

As discussed above, the external computing infrastructure 132 may be configured to manage interfacing and functionality with respect to the one or more IoT devices 106. In an exemplary embodiment, the data update module 142 may be configured to utilize the one or more IoT devices 106 to connect to the internet cloud 124 to send data associated with updates that pertain to one or more functions of the IoT devices 106 to the external computing infrastructure 132.

The method 400 may proceed to block 404, wherein the method 400 may include communicating data associated with updates that pertain to one or more functions of the IoT devices 106 from the external computing infrastructure 132 to the OEM server 116. In one embodiment, upon the external computing infrastructure 132 receiving data from the one or more IoT devices 106 that is associated with updates that pertain to one or more functions of the IoT devices 106, the data update module 142 may utilize the external computing infrastructure 132 to connect to the internet cloud 124 to send data that pertains to the updated status to the communication unit 130 of the OEM server 116. Accordingly, the OEM server 116 may obtain data that pertains to the updating of one or more functions of the IoT devices 106. As an example, upon communicating data associated with the update of a garage door status of a garage door opener IoT device, the external computing infrastructure 132 may communicate data associated with the update of the garage door status to the OEM server 116.

The method 400 may proceed to block 406, wherein the method 400 may include publishing an MQTT pub/sub message regarding the updates that pertain to one or more functions of the IoT devices 106 to the IoT broker 114. In an exemplary embodiment, the data update module 142 may be configured to utilize the processor 126 of the OEM server 116 to operably control the communication unit 130 to connect to the internet cloud 124 and publish an MQTT pub/sub message as a publisher within the publisher subscriber model. The MQTT pub/sub message published to the IoT broker 114 may include the information that is associated to the updates that pertain to one or more functions of one or more IoT devices 106 based on the data communicated from the external computing infrastructure 132 to the OEM server 116. As discussed above, the IoT broker 114 may act as a medium between the publisher OEM server 116 that publishes the MQTT pub/sub messages to the IoT broker 114 and subscribers such as the mobile device 110 that receive the MQTT pub/sub messages from the IoT broker 114.

The method 400 may proceed to block 408, wherein the method 400 may include outputting and communicating the MQTT pub/sub message regarding the updates that pertain to one or more functions of the IoT devices 106 to the subscribers. In an exemplary embodiment, the IoT broker 114 may be configured to output and communicate the MQTT pub/sub message regarding the updates that pertain to one or more functions of the one or more IoT devices 106 to the subscribers of the publisher subscriber model of the system 100. Accordingly, the data update module 142 may utilize the processor 134 of the mobile device 110 to operably control the communication unit 138 to instantaneously receive the MQTT pub/sub message regarding the updates that pertain to one or more functions of the one or more IoT devices 106 as communicated by the IoT broker 114.

In an exemplary embodiment, upon the receipt of the MQTT pub/sub message regarding the updates that pertain to one or more functions of the one or more IoT devices 106 by the communication unit 138 of the mobile device 110, the data update module 142 may communicate data associated with the receipt of the MQTT pub/sub message by the mobile device 110 as communicated from the IoT broker 114 to the message presentation module 144 of the mobility communication application 108.

The message presentation module 144 may be configured to update the one or more graphical user interfaces with information that may be associated with the MQTT pub/sub message indicating the updates that pertain to one or more functions of the IoT devices 106. Accordingly, the user 104 may be presented with an indication of the updates that pertain to one or more functions the one or more IoT devices 106 (e.g., real-time indication of an open/close status of a garage door opener). As such, through the use of publish/subscribe communication with the MQTT pub/sub message, the user 104 may be able to receive updates that pertain to one or more functions of one or more IoT devices 106 in real-time upon using the application 108 to determine such information through the mobile device 110.

Figure 5:
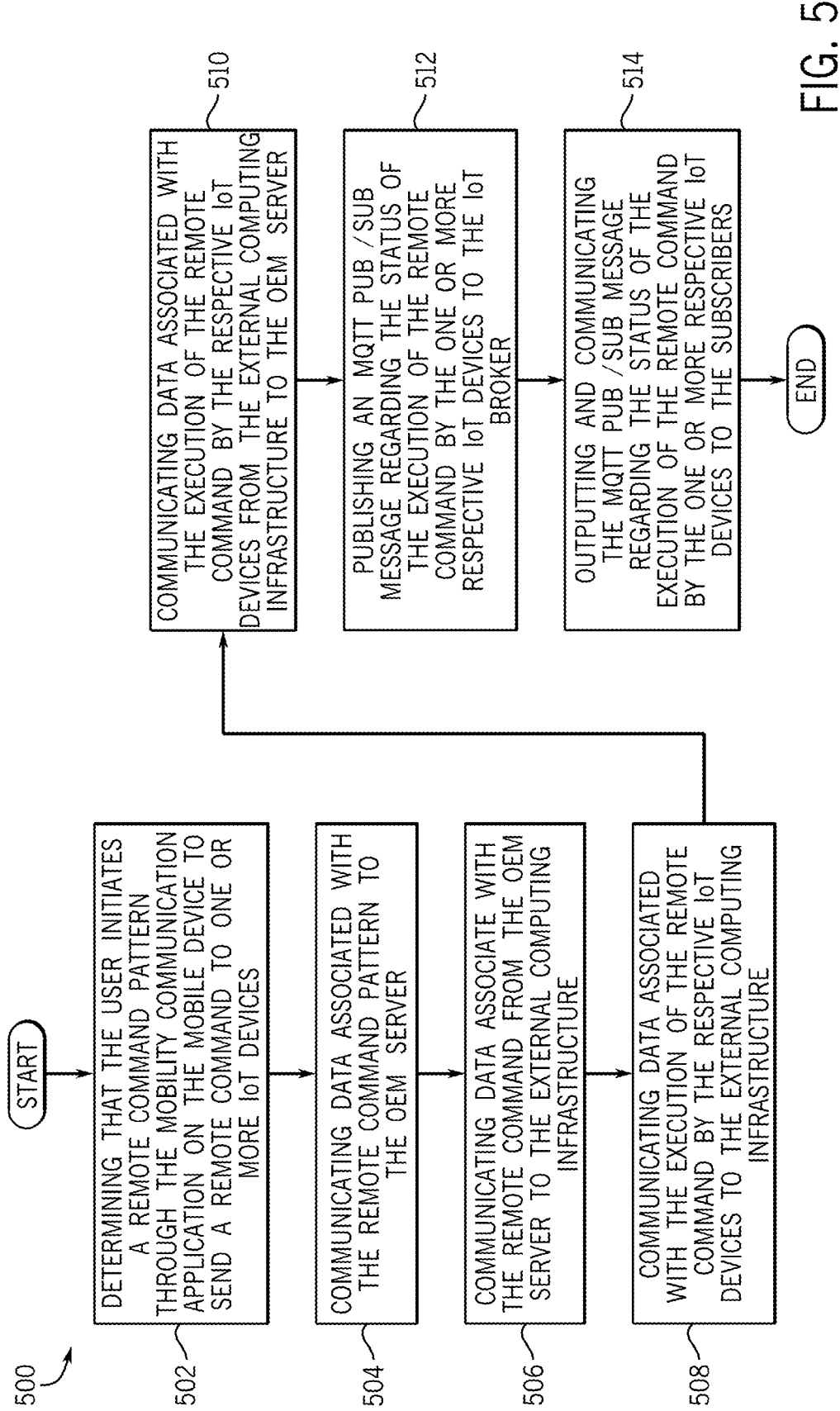
FIG. 5 is a process flow diagram of a method for completing a user initiated remote command to one or more IoT devices according to an exemplary embodiment of the present disclosure.

FIG. 5 is a process flow diagram of a method 500 for completing a user initiated remote command to one or more IoT devices 106 according to an exemplary embodiment of the present disclosure. FIG. 5 will be described with reference to the components of FIG. 1, though it is to be appreciated that the method 500 of FIG. 5 may be used with other systems/components. The method 500 will be described with respect to electronic communications of publisher subscriber model of the system 100 occurring between the OEM server 116 as a publisher, the IoT broker 114, and the mobile device 110 as a subscriber. However, it is to be appreciated that one or more additional computing systems that are configured as subscribers may be used in addition to or in lieu of the mobile device 110 to execute the method 500 of FIG. 5.

The method 500 may begin at block 502, wherein the method 500 may include determining that the user 104 initiates a remote command pattern through the mobility communication application 108 on the mobile device 110 to send a remote command to one or more IoT devices 106. As discussed above, the mobility communication application 108 may present one or more graphical user interfaces through the display 112 of the mobile device 110. The one or more graphical user interfaces may enable the user 104 to input user interface icons that may send particular remote commands from the mobile device 110 to be executed by one or more respective IoT devices 106. For example, such commands may include, but may not be limited to, a garage door open/close command, a home automation activation/deactivation command, a smart plug activation/deactivation command, a home HVAC temperature setting command, and the like.

In one embodiment, upon receiving a user input on one of the user interface icons that pertain to particular remote commands to be executed by the one or more respective IoT devices 106, the data reception module 140 of the mobility communication application 108 may analyze the user input and the associated remote command and may determine the user 104 has initiated a remote command pattern to send particular remote commands from the mobile device 110 to be executed by one or more respective IoT devices 106 from the API. Upon determining that the user 104 has initiated the remote command pattern, the data reception module 140 may be configured to communicate data pertaining to the remote command to the data update module 142 of the mobility communication application 108.

The method 500 may proceed to block 504, wherein the method 500 may include communicating data associated with the remote command pattern to the OEM server 116. In an exemplary embodiment, the data update module 142 may be configured to utilize the communication unit 138 of the mobile device 110 to send the data pertaining to the remote command inputted by the user 104 through the one or more graphical user interfaces to the communication unit 130 of the OEM server 116. Accordingly, data associated with the remote command inputted by the user 104 through the one or more graphical user interfaces of the mobility communication application 108 may be communicated from the mobile device 110 to the OEM server 116 through the internet cloud 124 to be analyzed by the processor 126 of the OEM server 116 to authenticate and authorize the data that pertains to a remote command to one or more respective IoT devices 106.

In one configuration, upon authentication and authorization of the data that pertains to the remote command, the processor 126 may send an authorization response to the data reception module 140. In some configurations, the processor 126 may utilize the communication unit 130 to send the authorization response back to the communication unit 138 of the mobile device 110 to be received by the data reception module 140.

The method 500 may proceed to block 506, wherein the method 500 may include communicating data associated with the remote command from the OEM server 116 to the external computing infrastructure 132. In an exemplary embodiment, upon the processor 126 of the OEM server 116 authenticating and authorizing the data, the data update module 142 may utilize the communication unit 130 of the OEM server 116 to connect to the internet cloud 124 to communicate the data pertaining to the user inputted remote command to the external computing infrastructure 132.

Upon receiving the data pertaining to the user inputted remote command, the data update module 142 may further utilize the external computing infrastructure 132 to connect to the internet cloud 124 to communicate the data to the one or more respective IoT devices 106. Accordingly, the data associated with the user inputted remote command may be directly communicated from the external computing infrastructure 132 that manages interfacing and functionality with respect to the one or more IoT devices 106 to the specific IoT device(s) 106 to execute the user inputted remote command.

The method 500 may proceed to block 508, wherein the method 500 may include communicating data associated with the execution of the remote command by the respective IoT devices 106 to the external computing infrastructure 132. In one embodiment, the data update module 142 may utilize the one or more respective IoT devices 106 that receive the data pertaining to the user initiated remote command to connect to the internet cloud 124 to send data that pertains to a command execution status to the external computing infrastructure 132. Accordingly, the external computing infrastructure 132 may obtain data that pertains to a status of the execution of the remote command by one or more respective IoT devices 106.

The method 500 may proceed to block 510, wherein the method 500 may include communicating data associated with the execution of the remote command by the respective IoT devices 106 from the external computing infrastructure 132 to the OEM server 116. In one embodiment, upon the external computing infrastructure 132 receiving data from the one or more IoT devices 106 that is associated with data that pertains to a command execution status of the user initiated remote command, the data update module 142 may utilize the external computing infrastructure 132 to connect to the internet cloud 124 to send the data to the communication unit 130 of the OEM server 116. Accordingly, the OEM server 116 may obtain data that pertains to the updating of one or more functions of the IoT devices 106. As an example, upon communicating data associated with the execution of a user initiated remote command to close a garage door to a garage door IoT device, a garage door status of a garage door opener IoT device may be communicated from the external computing infrastructure 132 to the OEM server 116.

The method 500 may proceed to block 512, wherein the method 500 may include publishing an MQTT pub/sub message regarding the status of the execution of the remote command by the one or more respective IoT devices 106 to the IoT broker 114. In an exemplary embodiment, the data update module 142 may be configured to utilize the processor 126 of the OEM server 116 to operably control the communication unit 130 to connect to the internet cloud 124 and publish an MQTT pub/sub message as a publisher within the publisher subscriber model. The MQTT pub/sub message published to the IoT broker 114 may include the status of the execution of the remote command by the one or more respective IoT devices 106 based on the data communicated from the external computing infrastructure 132 to the OEM server 116. As discussed above, the IoT broker 114 may act as a medium between the publisher OEM server 116 that publishes the MQTT pub/sub messages to the IoT broker 114 and subscribers such as the mobile device 110 that receive the MQTT pub/sub messages from the IoT broker 114.

The method 500 may proceed to block 514, wherein the method 500 may include outputting and communicating the MQTT pub/sub message regarding the status of the execution of the remote command by the one or more respective IoT devices 106 to the subscribers. In an exemplary embodiment, the IoT broker 114 may be configured to output and communicate the MQTT pub/sub message regarding the status of the execution of the remote command by the one or more respective IoT devices 106 to the subscribers of the publisher subscriber model of the system 100. Accordingly, the data update module 142 may utilize the processor 134 of the mobile device 110 to operably control the communication unit 138 to instantaneously receive the MQTT pub/sub message regarding the status of the execution of the remote command by the one or more respective IoT devices 106 as communicated by the IoT broker 114.

In an exemplary embodiment, upon the receipt of the MQTT pub/sub message regarding the status of the execution of the remote command by the vehicle 102 by the communication unit 138 of the mobile device 110, the data update module 142 may communicate data associated with the receipt of the MQTT pub/sub message by the mobile device 110 as communicated from the IoT broker 114 to the message presentation module 144 of the mobility communication application 108.

The message presentation module 144 may be configured to update the one or more graphical user interfaces with information that may be associated with the MQTT pub/sub message indicating the status of the execution of the remote command by the one or more respective IoT devices 106. Accordingly, the user 104 may be presented with an indication of the status of the execution of the remote command that has been inputted by the user 104 through the mobile device 110 (as determined at block 502). As such, through the use of publish/subscribe communication with the MQTT pub/sub message, the user 104 may be able to receive confirmation of the execution of one or more remote commands by the one or more respective IoT devices 106 in real-time upon using the application 108 to input such remote commands through the mobile device 110.

Figure 6:
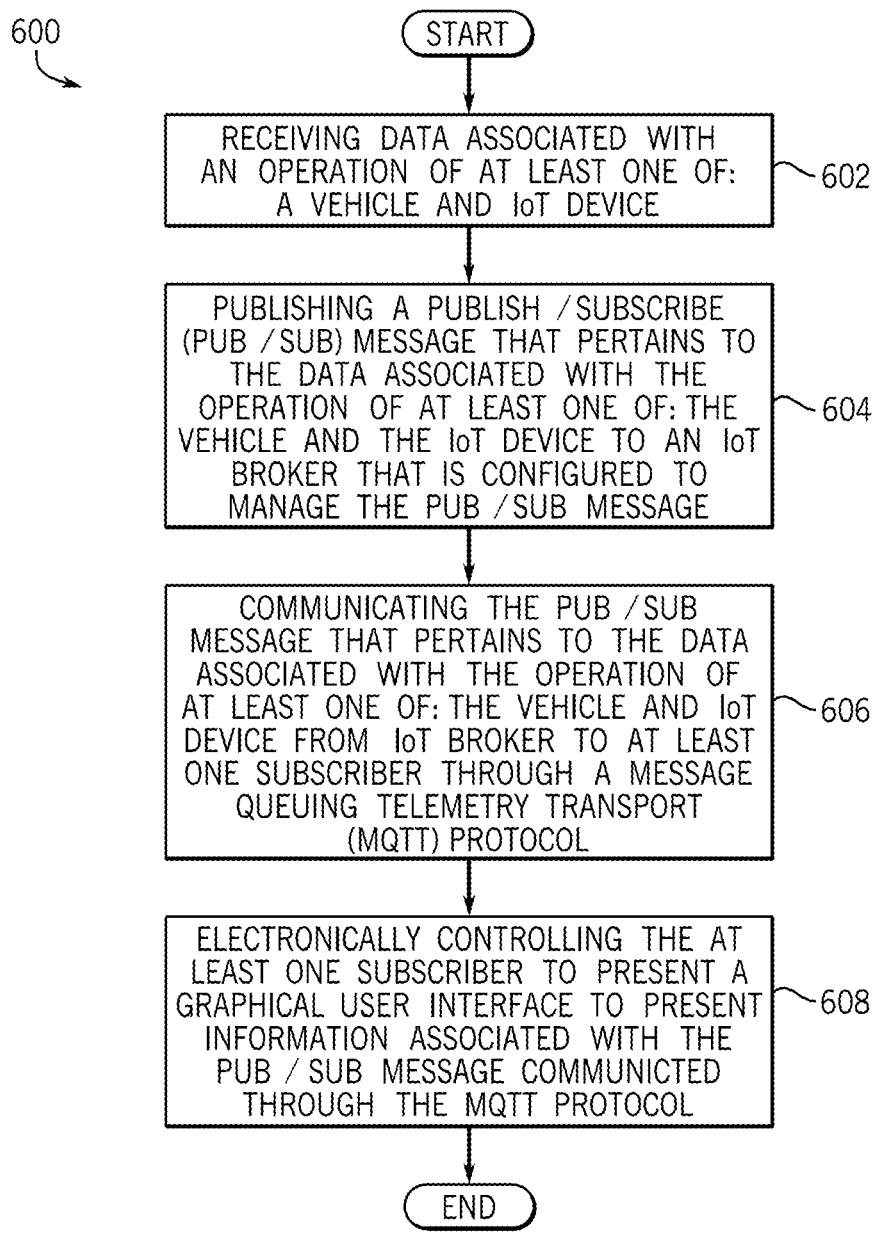
FIG. 6 is a process flow diagram of a method for providing enriched connected vehicle mobility communication according to an exemplary embodiment of the present disclosure.

FIG. 6 is a process flow diagram of a method 600 for providing enriched connected vehicle mobility communication according to an exemplary embodiment of the present disclosure. FIG. 6 will be described with reference to the components of FIG. 1, though it is to be appreciated that the method 600 of FIG. 6 may be used with other systems/components. The method 600 may begin at block 602, wherein the method 600 may include receiving data associated with an operation of at least one of: a vehicle 102 and an IoT device 106.

The method 600 may proceed to block 604, wherein the method 600 may include publishing a publish/subscribe (pub/sub) message that pertains to the data associated with the operation of at least one of: the vehicle 102 and the IoT device 106 to an IoT broker 114 that is configured to manage the pub/sub message. The method 600 may proceed to block 606, wherein the method 600 may include communicating the pub/sub message that pertains to the data associated with the operation of at least one of: the vehicle 102 and the IoT device 106 from the IoT broker 114 to at least one subscriber through a Message Queuing Telemetry Transport (MQTT) protocol. The method 600 may proceed to block 608, wherein the method 600 may include electronically controlling the at least one subscriber to present a graphical user interface to present information associated with the pub/sub message communicated through the MQTT protocol.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for providing enriched connected vehicle mobility communication, comprising:
    receiving data associated with an operation of at least one of: a vehicle and an Internet of Things (IoT) device;
    publishing a publish/subscribe (pub/sub) message that pertains to the data associated with the operation of at least one of: the vehicle and the IoT device to an IoT broker that is configured to manage the pub/sub message;
    communicating the pub/sub message that pertains to the data associated with the operation of at least one of: the vehicle and the IoT device from the IoT broker to at least one subscriber through a Message Queuing Telemetry Transport (MQTT) protocol; and
    electronically controlling the at least one subscriber to present a graphical user interface to present information associated with the pub/sub message communicated through the MQTT protocol, wherein the pub/sub message is published by an original equipment manufacturer (OEM) of the vehicle using an OEM server externally provided from the vehicle, and the OEM server manages the reception of the data associated with the operation of at least one of the vehicle and the IoT device and publishes the pub/sub message to the IoT broker using the MQTT protocol over Secure Sockets Layer (SSL).

2. The computer-implemented method of claim 1, wherein the at least one subscriber of the pub/sub message includes a mobile device used by a user, wherein the graphical user interface is presented through the mobile device to enable the user to remotely engage with at least one of: the vehicle and the IoT device through the mobile device.

3. The computer-implemented method of claim 2, wherein receiving the data associated with the operation includes receiving data from the vehicle that pertains to at least one of: an execution by the vehicle of at least one remote command that is initiated by the user through the mobile device and a status update that pertains to at least one function or system of the vehicle that is initiated from the vehicle.

4. The computer-implemented method of claim 3, wherein receiving the data associated with the operation includes receiving data from the IoT device that pertains to at least one of: an execution by the IoT device of at least one remote command that is initiated by the user through the mobile device and a status update that pertains to at least one function of the IoT device that is initiated from the IoT device.

5. The computer-implemented method of claim 4, wherein the data associated with the operation of the vehicle is communicated from the vehicle to the OEM server and the data associated with the IoT device is communicated from the IoT device to an external computing infrastructure that is managed by at least one third party, wherein the data associated with the IoT device is communicated from the external computing infrastructure to the OEM server.

6. The computer-implemented method of claim 5, wherein publishing the pub/sub message includes the OEM server publishing the pub/sub message to the IoT broker that includes at least one of: the execution by the vehicle of at least one remote command that is initiated by the user through the mobile device, the status update that pertains to at least one function or system of the vehicle, the execution by the IoT device of at least one remote command that is initiated by the user through the mobile device, and the status update that pertains to at least one function of the IoT device.

7. The computer-implemented method of claim 6, wherein communicating the pub/sub message that pertains to the data includes outputting and communicating the pub/sub message from the IoT broker to the at least one subscriber that includes the mobile device through the MQTT protocol.

8. The computer-implemented method of claim 7, wherein the mobile device is electronically controlled to present the graphical user interface with information associated with the pub/sub message that includes at least one of: the execution by the vehicle of at least one remote command that is initiated by the user, the status update that pertains to at least one function or system of the vehicle, the execution by the IoT device of at least one remote command that is initiated by the user, and the status update that pertains to at least one function of the IoT device.

9. The computer-implemented method of claim 1, wherein the reception of data associated with the operation of at least one of the vehicle and the IoT device results in a real-time update to the graphical user interface indicating a content of the pub/sub message.

10. A system for enriched connected vehicle mobility communication, comprising:
a memory storing instructions when executed by a processor cause the processor to:
receive data associated with an operation of at least one of: a vehicle and an Internet of Things (IoT) device;
publish a publish/subscribe (pub/sub) message that pertains to the data associated with the operation of at least one of: the vehicle and the IoT device to an IoT broker that is configured to manage the pub/sub message;
communicate the pub/sub message that pertains to the data associated with the operation of at least one of: the vehicle and the IoT device from the IoT broker to at least one subscriber through a Message Queuing Telemetry Transport (MQTT) protocol; and
electronically control the at least one subscriber to present a graphical user interface to present information associated with the pub/sub message communicated through the MQTT protocol, wherein
the pub/sub message is published by an original equipment manufacturer (OEM) of the vehicle using an OEM server externally provided from the vehicle, and the OEM server manages the reception of the data associated with the operation of at least one of the vehicle and the IoT device and publishes the pub/sub message to the IoT broker using the MQTT protocol over Secure Sockets Layer (SSL).

11. The system of claim 10, wherein the at least one subscriber of the pub/sub message includes a mobile device used by a user, wherein the graphical user interface is presented through the mobile device to enable the user to remotely engage with at least one of: the vehicle and the IoT device through the mobile device.

12. The system of claim 11, wherein receiving the data associated with the operation includes receiving data from the vehicle that pertains to at least one of: an execution by the vehicle of at least one remote command that is initiated by the user through the mobile device and a status update that pertains to at least one function or system of the vehicle that is initiated from the vehicle.

13. The system of claim 12, wherein receiving the data associated with the operation includes receiving data from the IoT device that pertains to at least one of: an execution by the IoT device of at least one remote command that is initiated by the user through the mobile device and a status update that pertains to at least one function of the IoT device that is initiated from the IoT device.

14. The system of claim 13, wherein the data associated with the operation of the vehicle is communicated from the vehicle to the OEM server and the data associated with the IoT device is communicated from the IoT device to an external computing infrastructure that is managed by at least one third party, wherein the data associated with the IoT device is communicated from the external computing infrastructure to the OEM server.

15. The system of claim 14, wherein publishing the pub/sub message includes the OEM server publishing the pub/sub message to the IoT broker that includes at least one of: the execution by the vehicle of at least one remote command that is initiated by the user through the mobile device, the status update that pertains to at least one function or system of the vehicle, the execution by the IoT device of at least one remote command that is initiated by the user through the mobile device, and the status update that pertains to at least one function of the IoT device.

16. The system of claim 15, wherein communicating the pub/sub message that pertains to the data includes outputting and communicating the pub/sub message from the IoT broker to the at least one subscriber that includes the mobile device through the MQTT protocol.

17. The system of claim 16, wherein the mobile device is electronically controlled to present the graphical user interface with information associated with the pub/sub message that includes at least one of: the execution by the vehicle of at least one remote command that is initiated by the user, the status update that pertains to at least one function or system of the vehicle, the execution by the IoT device of at least one remote command that is initiated by the user, and the status update that pertains to at least one function of the IoT device.

18. The system of claim 10, wherein the reception of data associated with the operation of at least one of the vehicle and the IoT device results in a real-time update to the graphical user interface indicating a content of the pub/sub message.

19. A non-transitory computer readable storage medium storing instructions that when executed by a computer, which includes a processor performs a method, the method comprising:
receiving data associated with an operation of at least one of: a vehicle and an Internet of Things (IoT) device;
publishing a publish/subscribe (pub/sub) message that pertains to the data associated with the operation of at least one of: the vehicle and the IoT device to an IoT broker that is configured to manage the pub/sub message;
communicating the pub/sub message that pertains to the data associated with the operation of at least one of: the vehicle and the IoT device from the IoT broker to at least one subscriber through a Message Queuing Telemetry Transport (MQTT) protocol; and
electronically controlling the at least one subscriber to present a graphical user interface to present information associated with the pub/sub message communicated through the MQTT protocol, wherein
the pub/sub message is published by an original equipment manufacturer (OEM) of the vehicle using an OEM server externally provided from the vehicle, and the OEM server manages the reception of the data associated with the operation of at least one of the vehicle and the IoT device and publishes the pub/sub message to the IoT broker using the MQTT protocol over Secure Sockets Layer (SSL).

20. The non-transitory computer readable storage medium of claim 19, wherein a mobile device is electronically controlled to present the graphical user interface with information associated with the pub/sub message that includes at least one of: an execution by the vehicle of at least one remote command that is initiated by a user, a status update that pertains to at least one function or system of the vehicle, an execution by the IoT device of at least one remote command that is initiated by the user, and a status update that pertains to at least one function of the IoT device.

* * * * *